United States Patent
Yun et al.

(10) Patent No.: US 9,515,688 B2
(45) Date of Patent: Dec. 6, 2016

(54) RECEPTION APPARATUS HAVING DUAL RECEPTION STRUCTURE, AND METHOD OF RECEIVING SIGNAL USING DUAL RECEPTION STRUCTURE

(71) Applicant: Samsung Electronics Co., Ltd., Suwon-si (KR)

(72) Inventors: Seok Ju Yun, Hwaseong-si (KR); Ui Kun Kwon, Hwaseong-si (KR); Seong Joong Kim, Hwaseong-si (KR); Chang Soon Park, Chungju-si (KR); Young Jun Hong, Seoul (KR); Hyo Sun Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/679,747

(22) Filed: Apr. 6, 2015

(65) Prior Publication Data

US 2015/0288396 A1    Oct. 8, 2015

(30) Foreign Application Priority Data

Apr. 7, 2014 (KR) ........................ 10-2014-0041223

(51) Int. Cl.
*H04B 1/10* (2006.01)
*H04W 24/10* (2009.01)

(52) U.S. Cl.
CPC ........... *H04B 1/1036* (2013.01); *H04W 24/10* (2013.01); *H04B 2001/1045* (2013.01)

(58) Field of Classification Search
CPC .................................................. H04B 1/1036
(Continued)

(56) References Cited

U.S. PATENT DOCUMENTS 5,339,455 A * 8/1994 Vogt .................. H03G 5/24
                                                           455/266
5,742,902 A    4/1998 Shore
(Continued)

FOREIGN PATENT DOCUMENTS

GB           639990 A     7/1950
KR   10-2010-0066717 A    6/2010

OTHER PUBLICATIONS

R. Gharpurey et al., "Feedforward Interference Cancellation in Narrow-Band Receivers," *Proceedings of the Dallas/CAS Workshop on Design, Applications, Integration, and Software (DCAS 2006)*, Oct. 2006, pp. 67-70, conference held on Oct. 29-30, 2006, in Richardson, TX, paper presented on Oct. 29, 2006.

(Continued)

*Primary Examiner* — Sanh Phu
(74) *Attorney, Agent, or Firm* — NSIP Law

(57) ABSTRACT

A reception apparatus having a dual reception structure includes a first receiver having a first quality (Q) factor and configured to receive a signal in a predetermined band in response to the first receiver being selected by a reception controller; a second receiver having a second Q factor greater than the first Q factor and configured to receive the signal in the predetermined band in response to the second receiver being selected by the reception controller; and a reception controller configured to select one of the first receiver and the second receiver based on interference information associated with an adjacent band adjacent to the predetermined band.

18 Claims, 18 Drawing Sheets

(58) Field of Classification Search
USPC .......................................................... 455/305
See application file for complete search history.

(56) References Cited

U.S. PATENT DOCUMENTS

| | | | |
|---|---|---|---|
| 6,560,301 B1* | 5/2003 | Cook | H04B 7/12 375/328 |
| 6,668,165 B1 | 12/2003 | Cloutier | |
| 7,043,223 B2 | 5/2006 | Lu et al. | |
| 7,324,615 B2 | 1/2008 | Lourens et al. | |
| 8,385,871 B2 | 2/2013 | Wyville | |
| 2005/0069051 A1 | 3/2005 | Lourens | |
| 2007/0139130 A1 | 6/2007 | Kim et al. | |
| 2009/0156158 A1 | 6/2009 | Kang et al. | |
| 2011/0274141 A1 | 11/2011 | Jantunen et al. | |

OTHER PUBLICATIONS

A. Safarian et al., "Integrated Blocker Filtering RF Front Ends," *Proceedings of the 2007 IEEE Radio Frequency Integrated Circuits Symposium (RFIC 2007)*, Jun. 2007, pp. 13-16, conference held on Jun. 3-5, 2007, in Honolulu, HI, paper presented on Jun. 4, 2007.

S. Ayazian et al., "Feedforward Interference Cancellation in Radio Receiver Front-Ends," *IEEE Transactions on Circuits and Systems—II: Express Briefs*, vol. 54, No. 10, Oct. 2007, pp. 902-906.

H. Darabi, "A Blocker Filtering Technique for SAW-Less Wireless Receivers," *IEEE Journal of Solid-State Circuits*, vol. 42, No. 12, Dec. 2007, pp. 2766-2773.

N. Pletcher et al., "A 2GHz 52μW Wake-Up Receiver with -72dBm Sensitivity Using Uncertain-IF Architecture," *Digest of Technical Papers of the 2008 IEEE International Solid-State Circuits Conference (ISSCC 2008)*, vol. 51, Feb. 2008, pp. 524, 525, and 633, conference held on Feb. 3-7, 2008, in San Francisco, CA, paper presented on Feb. 6, 2008.

M. Camus et al., "A 5.4 mW/0.07 mm² 2.4 GHz Front-End Receiver in 90 nm CMOS for IEEE 802.15.4 WPAN Standard," *IEEE Journal of Solid-State Circuits*, vol. 43, No. 6, Jun. 2008, pp. 1372-1383.

N. Pletcher et al., "A 52 μW Wake-Up Receiver With -72 dBm Sensitivity Using an Uncertain-IF Architecture," *IEEE Journal of Solid-State Circuits*, vol. 44, No. 1, Jan. 2009, pp. 269-280.

A. Fazzi et al., "A 2.75mW Wideband Correlation-Based Transceiver for Body-Coupled Communication," *Digest of Technical Papers of the 2009 IEEE International Solid-State Circuits Conference (ISSCC 2009)*, vol. 52, Feb. 2009, pp. 204, 205, and 205a, conference held on Feb. 8-12, 2009, in San Francisco, CA, paper presented on Feb. 10, 2009 (Visual Supplement not included).

N. Van Helleputte et al., "A Reconfigurable, 130 nm CMOS 108 pJ/pulse, Fully Integrated IR-UWB Receiver for Communication and Precise Ranging," *IEEE Journal of Solid-State Circuits*, vol. 45, No. 1, Jan. 2010, pp. 69-83.

X. Huang et al., "A 2.4GHz/915MHz 51μW Wake-Up Receiver with Offset and Noise Suppression," *Digest of Technical Papers of the 2010 IEEE International Solid-State Circuits Conference (ISSCC 2010)*, vol. 53, Feb. 2010, pp. 222, 223, and continuation page, conference held on Feb. 7-11, 2010, in San Francisco, CA, paper presented on Feb. 9, 2010.

M. Crepaldi et al., "An Ultra-Low-Power Interference-Robust IR-UWB Transceiver Chipset Using Self-Synchronizing OOK Modulation," *Digest of Technical Papers of the 2010 IEEE International Solid-State Circuits Conference (ISSCC 2010)*, vol. 53, Feb. 2010, pp. 226, 227, and continuation page, conference held on Feb. 7-11, 2010, in San Francisco, CA, paper presented on Feb. 9, 2010.

A. Balankutty et al., "A 0.6-V Zero-IF/Low-IF Receiver With Integrated Fractional-N Synthesizer for 2.4-GHz ISM-Band Applications," *IEEE Journal of Solid-State Circuits*, vol. 45, No. 3, Mar. 2010, pp. 538-553.

L. Yan et al., "A 3.9 mW 25-Electrode Reconfigured Sensor for Wearable Cardiac Monitoring System," *IEEE Journal of Solid-State Circuits*, vol. 46, No. 1, Jan. 2011, pp. 353-364.

M. Vidojkovic et al., "A 2.4GHz ULP OOK Single-Chip Transceiver for Healthcare Applications," *Digest of Technical Papers of the 2011 IEEE International Solid-State Circuits Conference (ISSCC 2011)*, vol. 54, Feb. 2011, pp. 458, 459, and continuation page, conference held on Feb. 20-24, 2011, in San Francisco, CA, paper presented on Feb. 23, 2011.

H. Darabi et al., "Highly Integrated and Tunable RF Front Ends for Reconfigurable Multiband Transceivers: A Tutorial," *IEEE Transactions on Circuits and Systems—I: Regular Papers*, vol. 58, No. 9, Sep. 2011, pp. 2038-2050.

A. Wong et al, "A 1V 5mA Multimode IEEE 802.15.6/Bluetooth Low-Energy WBAN Transceiver for Biotelemetry Applications," *Digest of Technical Papers of the 2012 IEEE International Solid-State Circuits Conference (ISSCC 2012)*, vol. 55, Feb. 2012, pp. 300, 301, and continuation page, conference held on Feb. 19-23, 2012, in San Francisco, CA, paper presented on Feb. 21, 2012.

Y.-H Liu et al., "A 2.7nJ/b Multi-Standard 2.3/2.4GHz Polar Transmitter for Wireless Sensor Networks," *Digest of Technical Papers of the 2012 IEEE International Solid-State Circuits Conference (ISSCC 2012)*, vol. 55, Feb. 2012, pp. 448-450, conference held on Feb. 19-23, 2012, in San Francisco, CA, paper presented on Feb. 22, 2012.

F. Fernández-Rodriguez et al., "Advanced Quenching Techniques for Super-Regenerative Radio Receievers," *IEEE Transactions on Circuits and Systems—I: Regular Papers*, vol. 59, No. 7, Jul. 2012, pp. 1533-1545.

* cited by examiner

RECEPTION APPARATUS HAVING DUAL RECEPTION STRUCTURE, AND METHOD OF RECEIVING SIGNAL USING DUAL RECEPTION STRUCTURE

CROSS-REFERENCE TO RELATED APPLICATIONS

This application claims the benefit under 35 USC 119(a) of Korean Patent Application No. 10-2014-0041223 filed on Apr. 7, 2014, in the Korean Intellectual Property Office, the entire disclosure of which is incorporated herein by reference for all purposes.

BACKGROUND

1. Field

The following description relates to an apparatus and a method of receiving a signal.

2. Description of Related Art

A reception structure using super-regenerative oscillation (SRO) exhibits a superior receiver sensitivity at a low power due to a high radio frequency (RF) gain characteristic. However, the frequency selectivity of the reception structure using SRO is low because filtering is physically performed on a received signal in an RF band.

Due to the low frequency selectivity of the reception structure using SRO, an interference component present in a channel adjacent to a channel from which a signal is received, or in a frequency band adjacent to a frequency band from which a signal is received, may deteriorate a signal received in an RF bad.

In order to increase the frequency selectivity while maintaining the technical benefits, for example, the high RF gain, of the reception structure using SRO, a quenching signal based on an SRO structure may be adjusted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reception apparatus having a dual reception structure, the reception apparatus includes a first receiver having a first quality (Q) factor and configured to receive a signal in a predetermined band in response to the first receiver being selected by a reception controller; a second receiver having a second Q factor greater than the first Q factor and configured to receive the signal in the predetermined band in response to the second receiver being selected by the reception controller; and a reception controller configured to select one of the first receiver and the second receiver based on interference information associated with an adjacent band adjacent to the predetermined band.

The reception apparatus may further include an interference detector configured to detect an interference signal from the adjacent band, and generate the interference information based on the interference signal.

The reception controller may be further configured to select the second receiver to receive the signal in response to an interference signal being present in the adjacent band.

The reception controller may be further configured to select the first receiver to receive the signal in response to an interference signal being absent in the adjacent band.

The reception controller may be further configured to calculate a packet error rate (PER) with respect to a predetermined first time interval during reception of the signal by the first receiver as the interference information; and select the second receiver to receive the signal in response to the PER being greater than a first threshold value.

The reception controller may be further configured to calculate a ratio of a period of time during which an interference signal is present in the adjacent band to a predetermined second time interval during reception of the signal by the second receiver as the interference information; and select the first receiver to receive the signal in response to the ratio being smaller than a second threshold value.

The first receiver may include a super-regenerative oscillator configured to apply a super-regenerative gain to the signal; and the second receiver may include a frequency converter configured to be operated by an oscillation signal of the super-regenerative oscillator and configured to convert the signal to an intermediate frequency (IF) band lower than a frequency of the signal.

The first receiver may include a super-regenerative oscillator configured to apply a super-regenerative gain to the signal; and the second receiver may include a local oscillator independent of the super-regenerative oscillator and configured to generate a local oscillator signal; and a frequency converter configured to be operated by the local oscillation signal and configured to convert the signal to an intermediate frequency (IF) band lower than a frequency of the signal.

The second receiver may include an in-phase converter configured to convert the signal to an in-phase signal in an intermediate frequency (IF) band lower than a frequency of the signal; and a quadrature converter configured to convert the signal to a quadrature signal in the IF band.

The reception controller may be further configured to control the first receiver to receive the signal in response to the second receiver receiving the signal for a predetermined time interval.

In another general aspect, a method of receiving a signal using a dual reception structure includes selecting one of a first receiver having a first quality (Q) factor and a second receiver having a second Q factor greater than the first Q factor to receive a signal in a predetermined band based on interference information associated with an adjacent band adjacent to the predetermined band; and receiving the signal in the predetermined band using the selected one of the first receiver and the second receiver.

The method may further include detecting an interference signal from the adjacent band; and generating the interference information based on the interference signal.

The selecting of the one of the first receiver and the second receiver may include selecting the second receiver in response to an interference signal being present in the adjacent band.

The selecting of the one of the first receiver and the second receiver may include selecting the first receiver in response to an interference signal being absent in the adjacent band.

The selecting of the one of the first receiver and the second receiver may include calculating a packet error rate (PER) with respect to a predetermined first time interval during reception of the signal by the first receiver as the interference information; and selecting the second receiver in response to the PER being greater than a first threshold value.

The selecting of the one of the first receiver and the second receiver may include calculating a ratio of a period of time during which the interference signal is present in the adjacent band to a predetermined second time interval during reception of the signal by the second receiver as the interference information; and selecting the first receiver in response to the ratio being smaller than a second threshold value.

The receiving of the signal in the predetermined band using the selected one of the first receiver and the second receiver may include applying a super-regenerative gain to the signal using a super-regenerative oscillator of the first receiver in response to the first receiver being the selected one of the first receiver and the second receiver; and converting the signal to a low intermediate frequency (IF) band lower than a frequency of the signal using a frequency converter of the second receiver configured to be operated by an oscillation signal of the super-regenerative oscillator in response to the second receiver being the selected one of the first receiver and the second receiver.

The receiving of the signal in the predetermined band using the selected one of the first receiver and the second receiver may include applying a super-regenerative gain to the signal using a super-regenerative oscillator of the first receiver in response to the first receiver being the selected one of the first receiver and the second receiver; and converting the signal to an intermediate frequency (IF) lower than a frequency of the signal using a frequency converter of the second receiver configured to be operated by a local oscillation signal of a local oscillator of the second receiver in response to the second receiver being the selected one of the first receiver and the second receiver, the local oscillator being independent of the super-regenerative oscillator.

The receiving of the signal in the predetermined band using the selected one of the first receiver and the second receiver may include converting the signal to an in-phase signal in an intermediate frequency (IF) band lower than a frequency of the signal and a quadrature signal in the IF band in response to the second receiver being the selected one of the first receiver and the second receiver.

The method may further include controlling the first receiver to receive the signal in response to the second receiver receiving the signal for a predetermined time interval.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Figure 1:
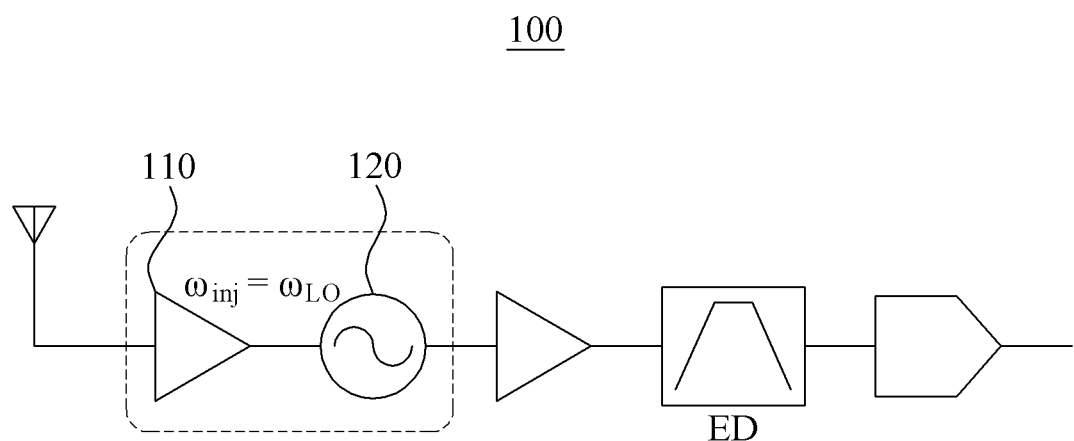
FIGS. 1 through 3 illustrate examples of a structure and a frequency response of a super-regenerative receiver (SRR).
Figure 2:
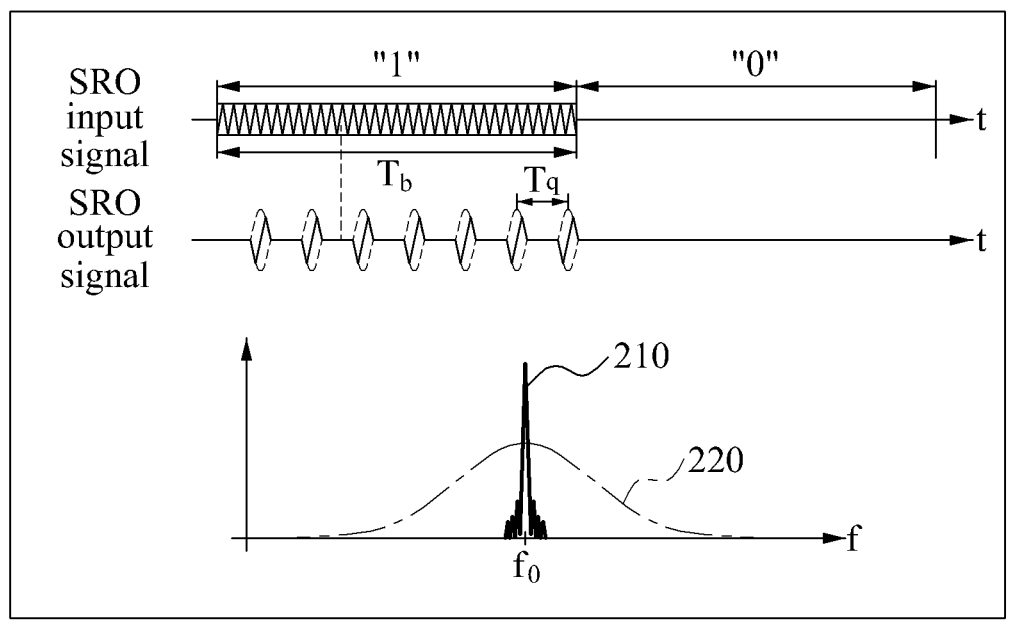
Figure 3:
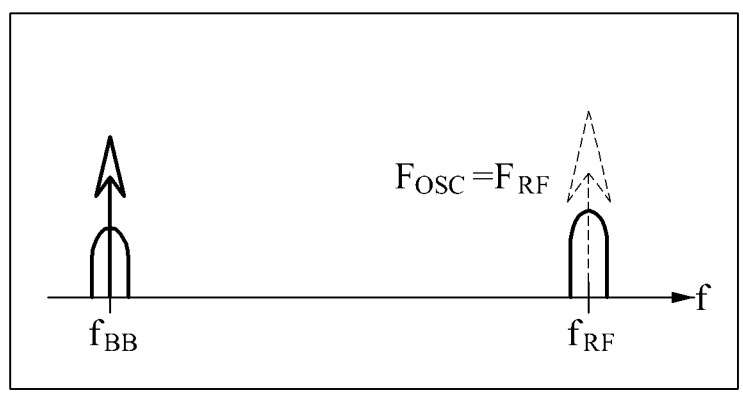

FIGS. 1 through 3 illustrate an example of a structure and a frequency response of a super-regenerative receiver (SRR) 100.

Referring to FIG. 1, the SRR 100 is a receiver using a super-regenerative oscillator (SRO) 120 to apply a super-regenerative gain to a signal in a radio frequency (RF) band that is received through a low-noise amplifier (LNA) 110. The SRO 120 that provides the super-regenerative gain is controlled to oscillate at a frequency $F_{OSC}$ that is equal to a carrier frequency $F_{RF}$ of the input signal from the LNA 110 as shown in FIG. 3, and is locked to the signal input from the LNA 110. In this example, a locking range $f_{lock}$ of an input frequency of the SRR 100 is represented by Equation 1 below.

$$f_{lock} = \frac{\omega_o I_{Inj}}{2 Q I_{Osc} \sqrt{1 - (I_{Osc}^2 / I_{Inj}^2)}}$$

In Equation 1, Q denotes a quality factor of an inductor-capacitor circuit (LC) or resonator of the SRO 120 included in the SRR 100, and will be referred to herein as a Q factor. $I_{Inj}$ denotes an amplitude of a current of an input signal, $I_{OSC}$ denotes an amplitude of a current of an oscillation signal output from the SRO 120, and $w_o$ denotes an operating frequency of the SRO 120.

As can be seen from Equation 1, the locking range $f_{lock}$ of the frequency of the SRR 100 is inversely proportional to the Q factor of the SRO 120. When the frequency of the input signal from the LNA 110 is nearly equal to the operating frequency of the SRO 120, the locking range may be maintained constant by increasing $I_{Inj}$ in accordance with the Q factor increasing. In this example, enhancing a receiver sensitivity of the SRR 100 may be hindered because the Q factor of the SRO 120 is relatively great.

The Q factor of the SRO 120 serving as a filter needs to increase in order to improve a frequency selectivity of the SRR 100. However, there is a limit to how much the Q factor can be increased because the SRO 120 oscillates at a frequency that is equal to the frequency of the RF carrier of the input signal from the LNA 110.

For example, referring to FIG. 2, the SRR 100 as shown in FIG. 1 receives a signal by controlling oscillation of the SRO 120, such as a voltage-controlled oscillator (VCO), based on an input signal 210 in an RF band input from the LNA 110. The SRR 100 senses the input signal 210 through an output signal of the SRO 120 having a that is identical to the input signal 210. In this example, a frequency selectivity of the SRR 100 is proportional to a frequency response of the resonator of the SRO 120.

The SRR 100 has a relatively low frequency selectivity because a Q factor of the resonator in an RF band is relatively low. For example, the input signal 210 in the RF band may be easily deteriorated by an interference signal in the vicinity of a desired frequency band because a frequency response characteristic 220 of the SRO 120 serving as the filter displays a gradual slope as shown in FIG. 2.

In one example, an additional filter may be disposed in a front of the SRR 100 or the Q factor of the SRO 120 may be increased to increase the frequency selectivity of the SRR 100. However, implementing a high Q factor in an on-chip RF circuit may present a technical challenge. In another example, a quenching signal of the SRR 100 may be improved to increase the frequency selectivity, but the complexity of the SRR 100 may be increased due to a great number of additional circuits needed to improve the quenching signal.

A reception apparatus having a dual reception structure may further include a superheterodyne reception structure or a double conversion reception structure and an interference detector in addition to a SRR structure. In this instance, an optimum reception structure may be selected based on interference information corresponding to an interference signal detected by the interference detector.

As used herein, the term "predetermined band" refers to a band to be used to receive a signal, and may also referred to as a desired band, a communication band, or an in-band. The term "adjacent band" refers to a band adjacent to the predetermined band.

Figure 4:
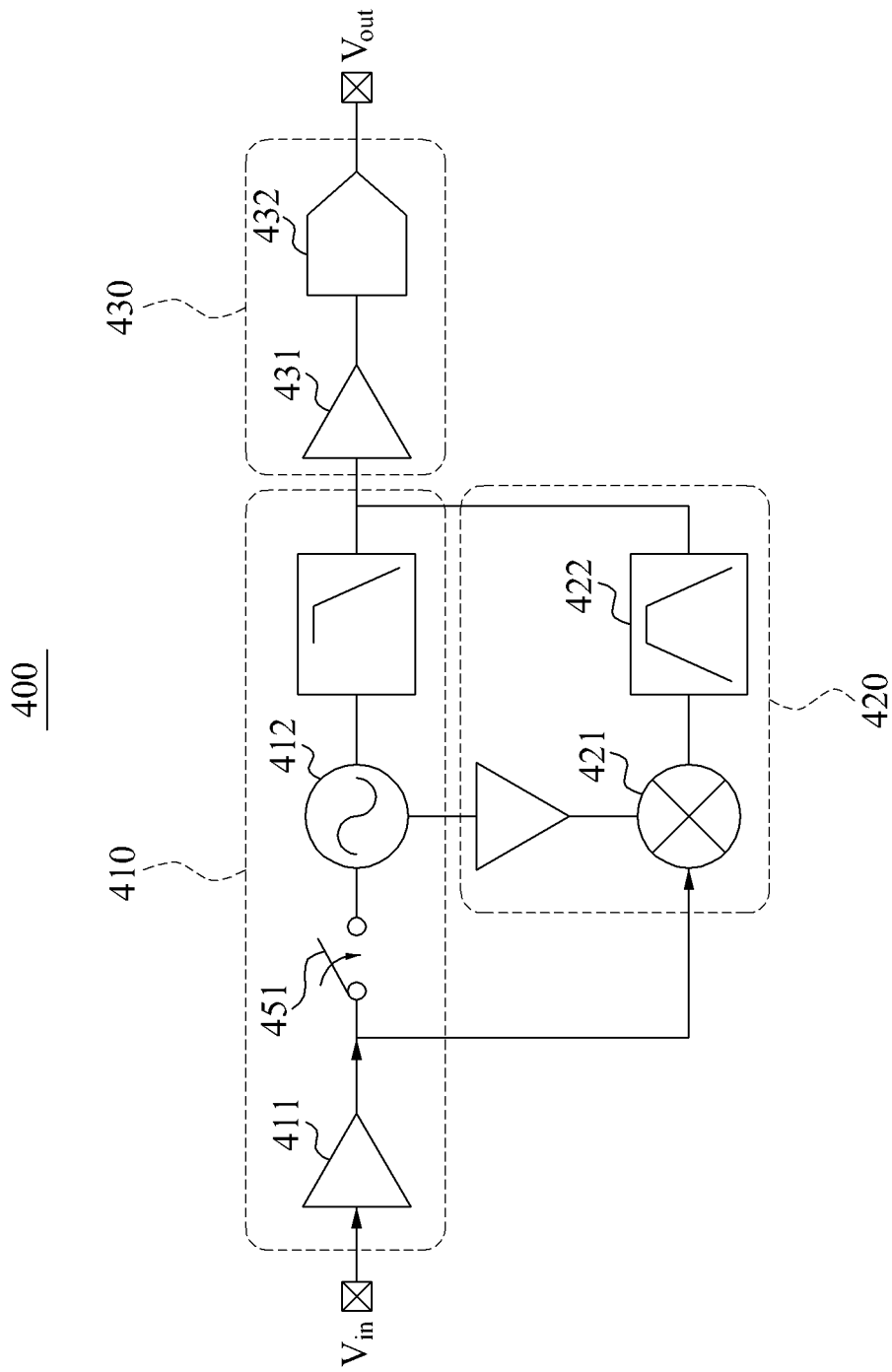
FIGS. 4 and 5 illustrate examples of reception apparatuses having a dual reception structure including an interference detector.
Figure 5:
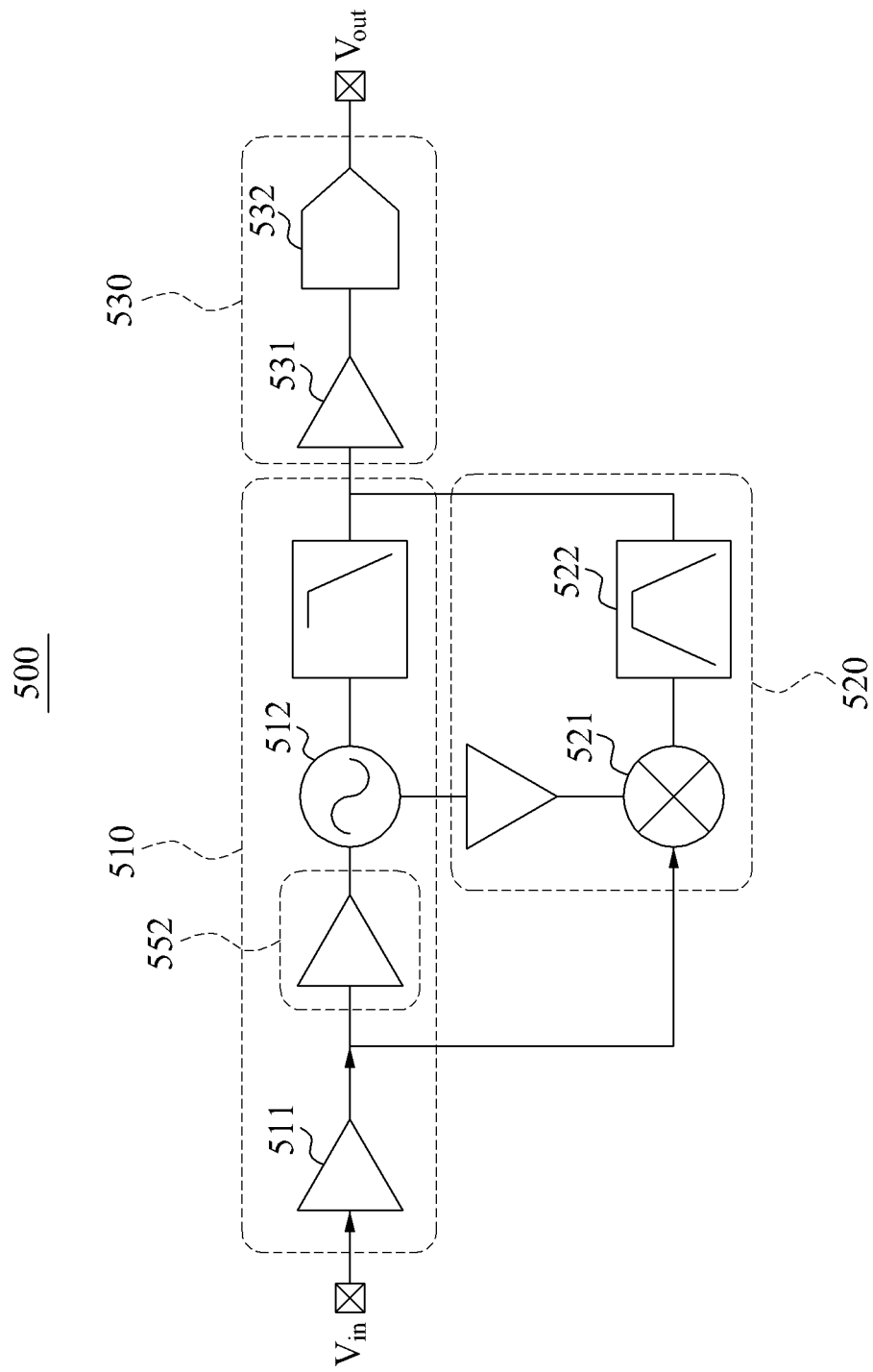

FIGS. 4 and 5 illustrate examples of reception apparatuses 400 and 500 having a dual reception structure including an interference detector.

A reception apparatus having a dual reception structure includes a first receiver, for example, an SRR, and a second receiver, for example, a superheterodyne receiver. In this example, the superheterodyne receiver performs frequency conversion to convert an RF signal to a lower frequency in a direct current (DC) band or an intermediate frequency (IF) band, i.e., in a baseband (BB), using frequency converters 421 and 521. The IF band is An interference signal or a noise signal in another frequency band is filtered out and removed from the converted signal through filters 422 and 522, for example, a low pass filter (LPF) or an IF filter, to obtain a wanted signal band remaining after the filtering. The frequency converters 421 and 521 may include a mixer.

The superheterodyne receiver that performs frequency filtering in a baseband (BB) can solve an issue of the SRR that is poor at removing an interference signal adjacent to a desired band.

The reception apparatuses 400 and 500 having the dual reception structure operate as the superheterodyne receiver in an RF reception condition in which there is an adjacent interference signal, and operate as the SRR in an RF reception condition in which there is not an adjacent interference signal.

Superheterodyne reception structures 420 and 520 increase a frequency selectivity while maintaining a low power characteristic and a high receiver sensitivity based on SRR structures 410 and 510.

FIGS. 4 and 5 illustrate a basic structure of the reception apparatuses 400 and 500 having the dual reception structure. The reception apparatuses 400 and 500 having the dual reception structure include the SRR structures 410 and 510, the superheterodyne reception structures 420 and 520, and baseband blocks 430 and 530. In this example, the SRR structures 410 and 510 include LNAs 411 and 511, and SROs 412 and 512. The superheterodyne reception structures 420 and 520 include the frequency converters 421 and 521, for example, a mixer, and a filter, for example, an LPF or a band-pass filter (BPF). The baseband blocks 430 and 530 include variable-gain amplifiers (VGA) 431 and 531, and analog-to-digital converters (ADC) 432 and 532.

The reception apparatuses 400 and 500 having the dual reception structure operate to receive a signal using the superheterodyne reception structures 420 and 520 in a reception condition including an adjacent interference signal in a desired band, and in a reception condition without an adjacent interference signal in a desired band, operate to receive a signal using the SRR structures 410 and 510. In this example, the superheterodyne reception structures 420 and 520 and the SRR structures 410 and 510 are selected through on/off control of a switch 451 as shown in FIG. 4 or an isolation amplifier 552 as shown in FIG. 5.

A superheterodyne reception structure or a double conversion reception structure may be inserted to an SRR structure to enhance a frequency selectivity of a reception apparatus. For example, when low power and a high receiver sensitivity are required, the reception apparatus operates in the SRR structure, and when an interference signal needs to be removed, operates in the superheterodyne reception structure. Through this, stable operation at low power and low noise may be possible while efficiently removing the interference signal.

Figure 6:
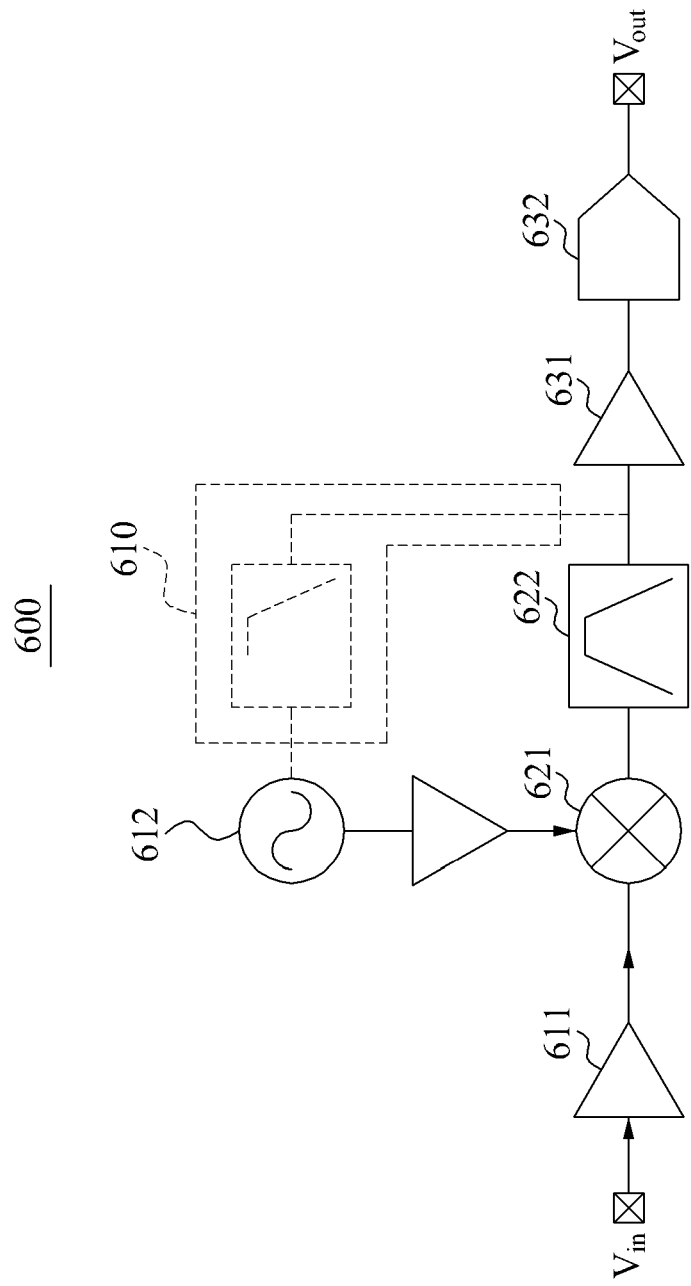
FIGS. 6 and 7 illustrate examples of reception apparatuses having a dual reception structure.
Figure 7:
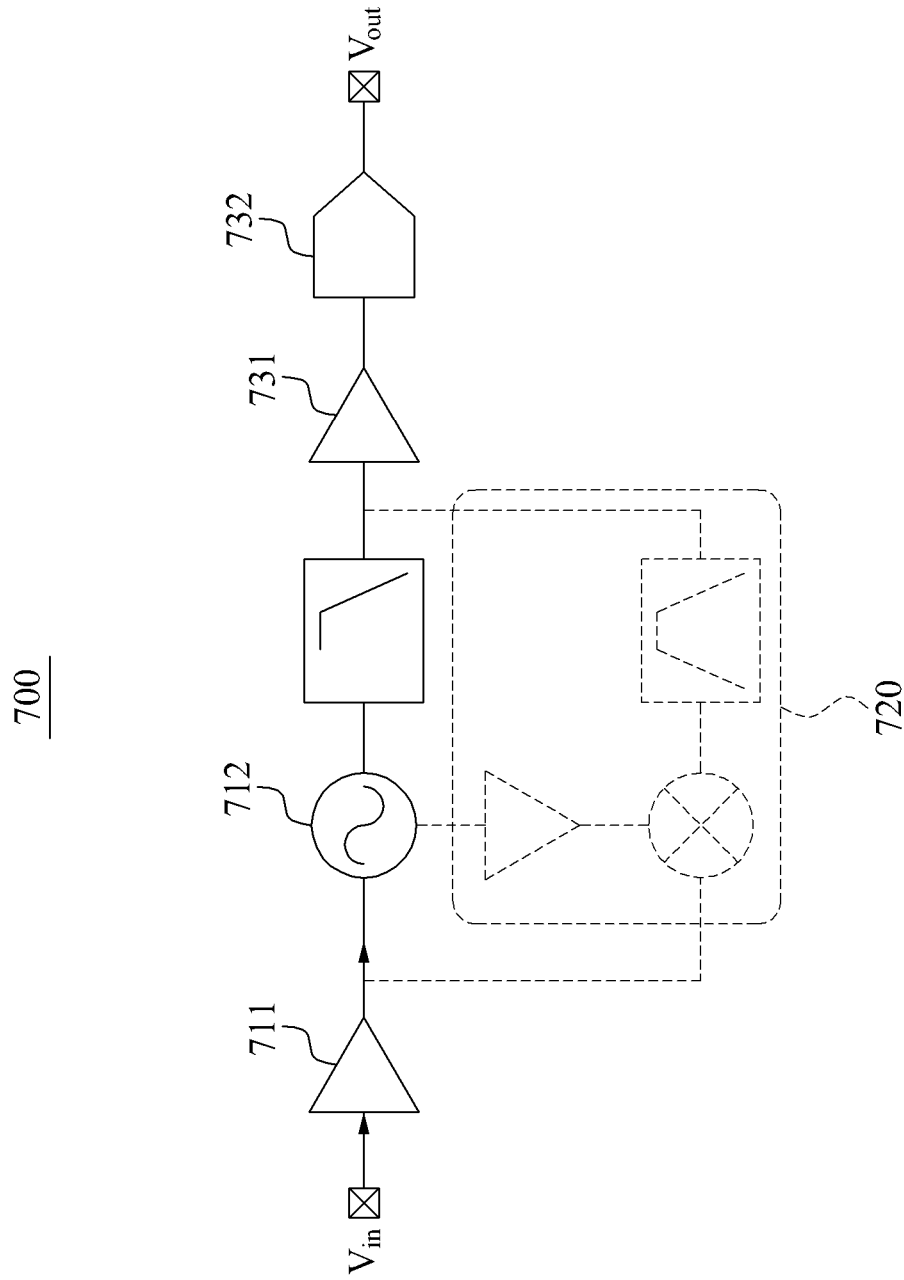

FIGS. 6 and 7 illustrate examples of reception apparatuses 600 and 700 having a dual reception structure.

FIG. 6 illustrates the reception apparatus 600 having the dual reception structure in a presence of an interference signal in an adjacent band adjacent to a desired band.

Descriptions pertaining to the LNAs 411 and 511, the SROs 412 and 512, the frequency converters 421 and 521, the filters 422 and 522, the VGAs 431 and 531, and the ADCs 432 and 532 provided with reference to FIGS. 4 and 5 are also applicable to an LNA 611, an SRO 612, a frequency converter 621, a filter 622, a VGA 631, and an ADC 632 of FIG. 6.

In the reception apparatus 600 having the dual reception structure illustrated in FIG. 6, an SRR structure is deactivated, and a path corresponding to a superheterodyne reception structure is activated. In this example, a path 610 corresponding to a filter, for example, a super-regenerative gain, of the SRO 612 is deactivated. However, the SRO 612, for example, a first oscillator, operates the frequency converter 621 included in the superheterodyne reception structure.

FIG. 7 illustrates the reception apparatus 700 having the dual reception structure in an absence of an interference signal in an adjacent band.

Descriptions pertaining to the LNAs 411 and 511, the SROs 412 and 512, the frequency converters 421 and 521, the filters 422 and 522, the VGAs 431 and 531, and the ADCs 432 and 532 provided with reference to FIGS. 4 and 5 are also applicable to an LNA 711, an SRO 712, a VGA 731, and an ADC 732 of FIG. 7.

In the reception apparatus 700 having the dual reception structure illustrated in FIG. 7, an SRR structure is activated, and a path 720 corresponding to a superheterodyne reception structure is deactivated. In this example, a filter function, for example, a super-regenerative gain, of the SRO 712, is activated.

Paths and blocks not used in FIGS. 6 and 7 are powered down, thereby reducing power consumption.

Figure 8:
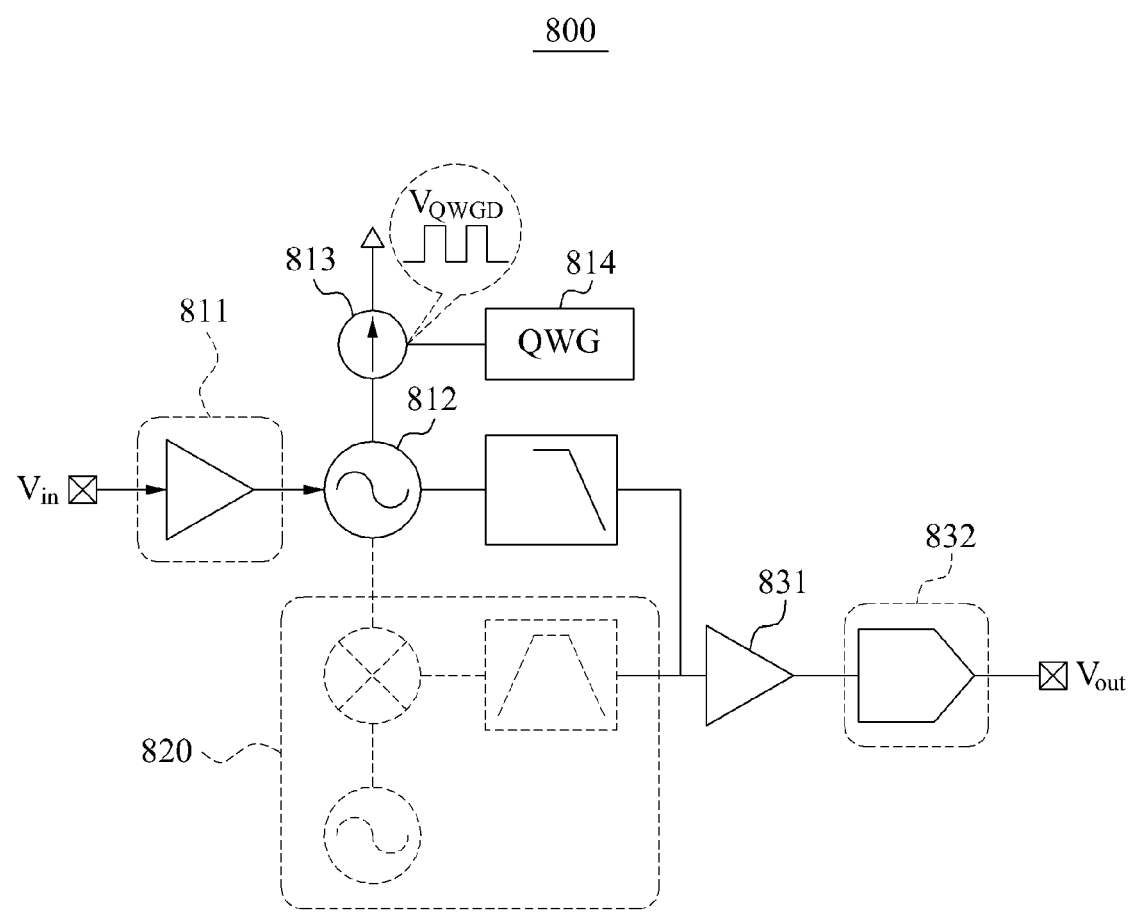
FIGS. 8 and 9 illustrate examples of reception apparatuses having a dual reception structure including an additional oscillator.
Figure 9:
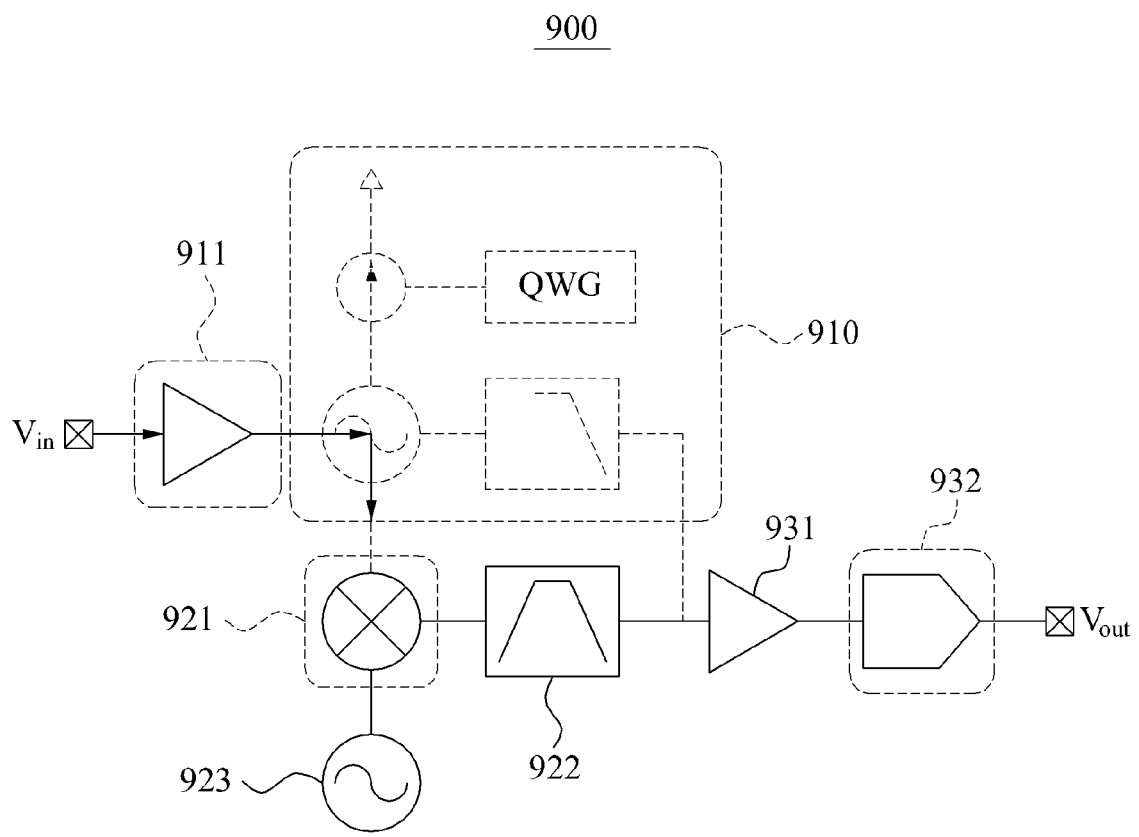

FIGS. 8 and 9 illustrate examples of reception apparatuses 800 and 900 having a dual reception structure including an additional oscillator.

Referring to FIGS. 8 and 9, the reception apparatuses 800 and 900 having the dual reception structure include a first oscillator 812, for example, an SRO, and a second oscillator 923. In this example, LNAs 811 and 911 and the first oscillator 812 share an LC tank circuit by blocking a current of an active component.

Descriptions pertaining to the LNAs 411 and 511, the SROs 412 and 512, the frequency converters 421 and 521, the filters 422 and 522, the VGAs 431 and 531, and the ADCs 432 and 532 provided with reference to FIGS. 4 and 5 are also applicable to LNAs 811 and 911, a first oscillator 812, a frequency converter 921, a filter 922, VGAs 831 and 931, and ADCs 832 and 932 of FIGS. 8 and 9.

FIG. 8 illustrates an example in which the reception apparatus 800 having the dual reception structure operates using an SRR structure. In this example, a current in the SRO 812 is controlled by a bias current source 813 and a quenching waveform generator (QWG) 814 that generates a quenching waveform $V_{QWGD}$. A path 820 corresponding to a superheterodyne reception structure is deactivated.

FIG. 9 illustrates an example in which the reception apparatus 900 having the dual reception structure operates using a superheterodyne reception structure. In this example, the second oscillator 923 generates a local oscillator (LO) signal, and the frequency converter 921 is operated by the LO signal. A path 910 corresponding to the SRR structure is deactivated. For example, a current and a quenching current of the SRO are blocked.

Figure 10:
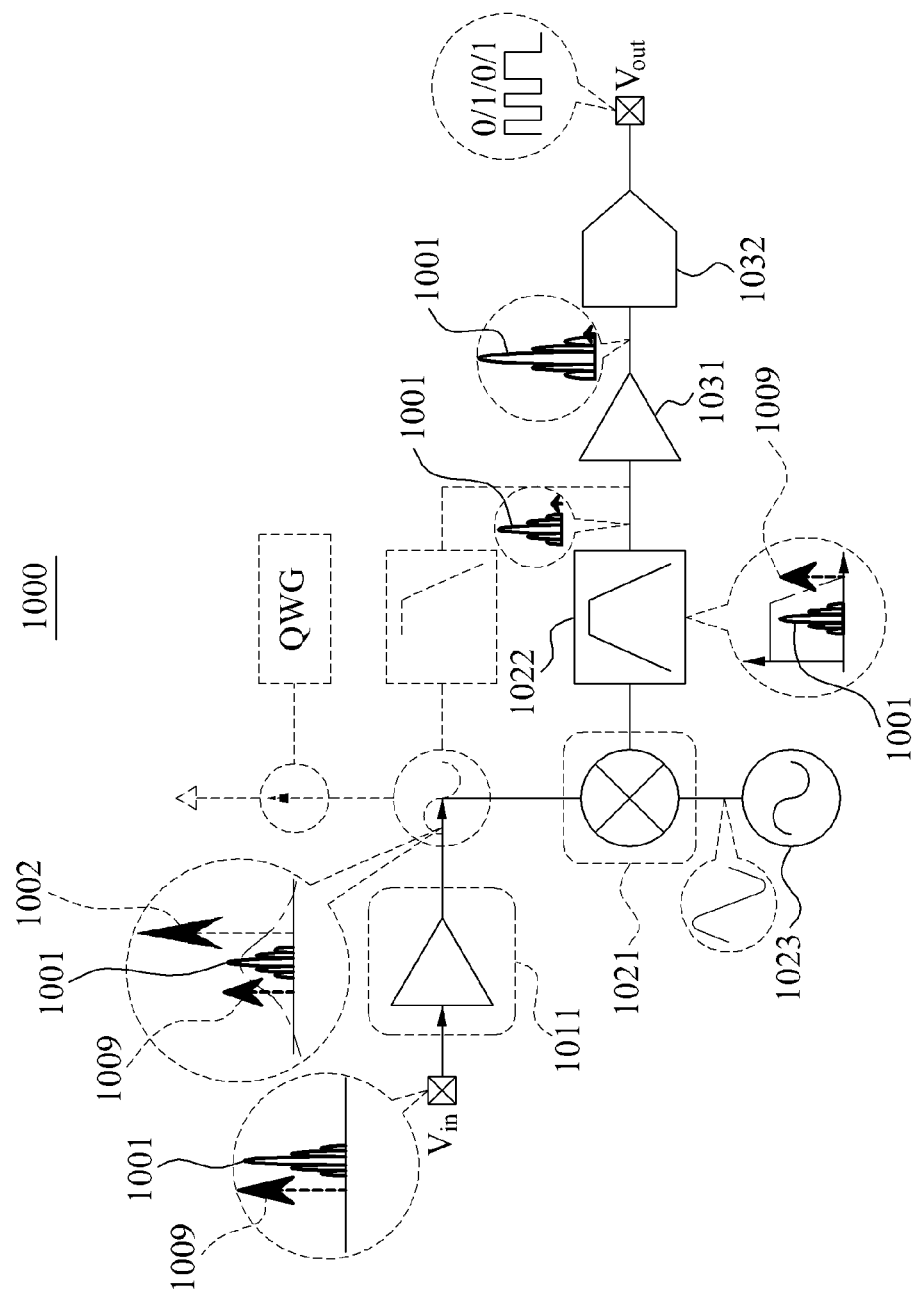
FIGS. 10 through 12 illustrate examples of a process of removing an interference signal using reception apparatuses having a dual reception structure.
Figure 11:
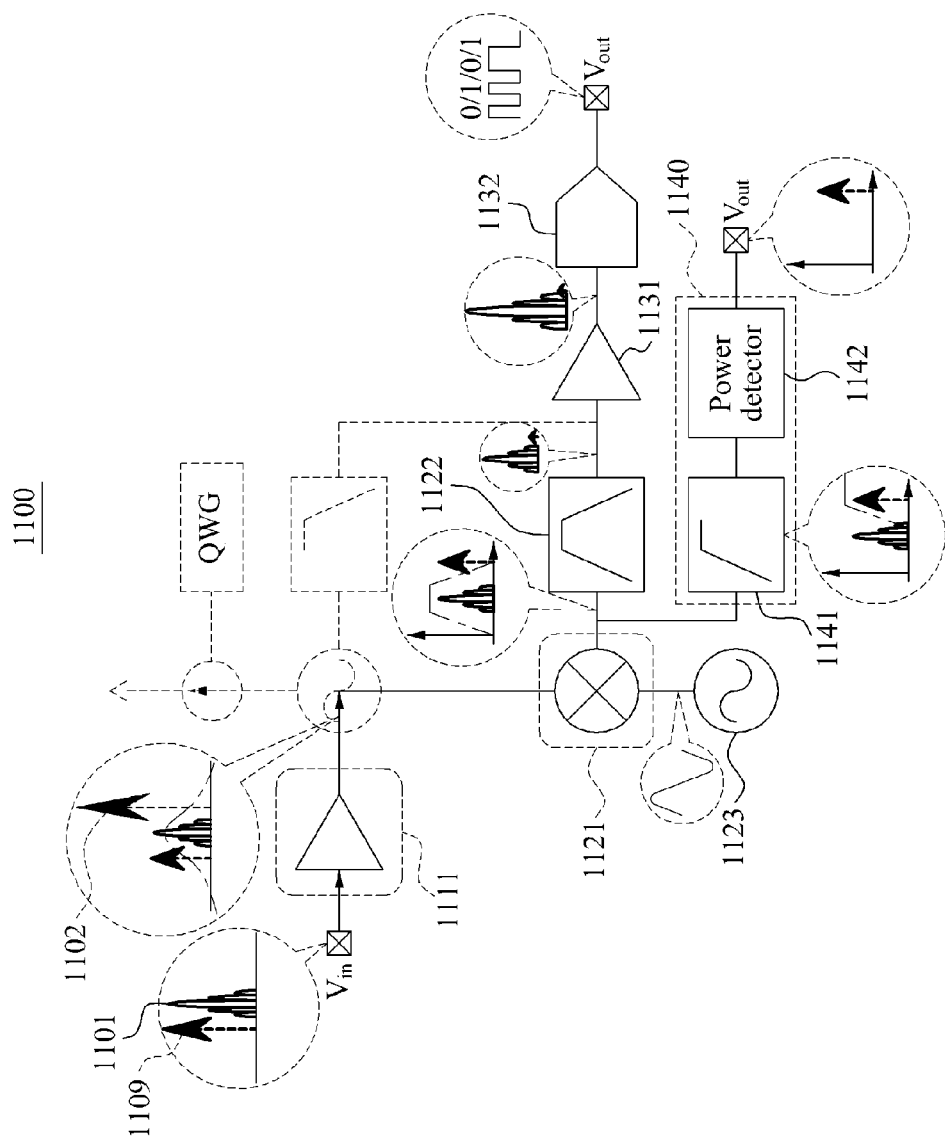
Figure 12:
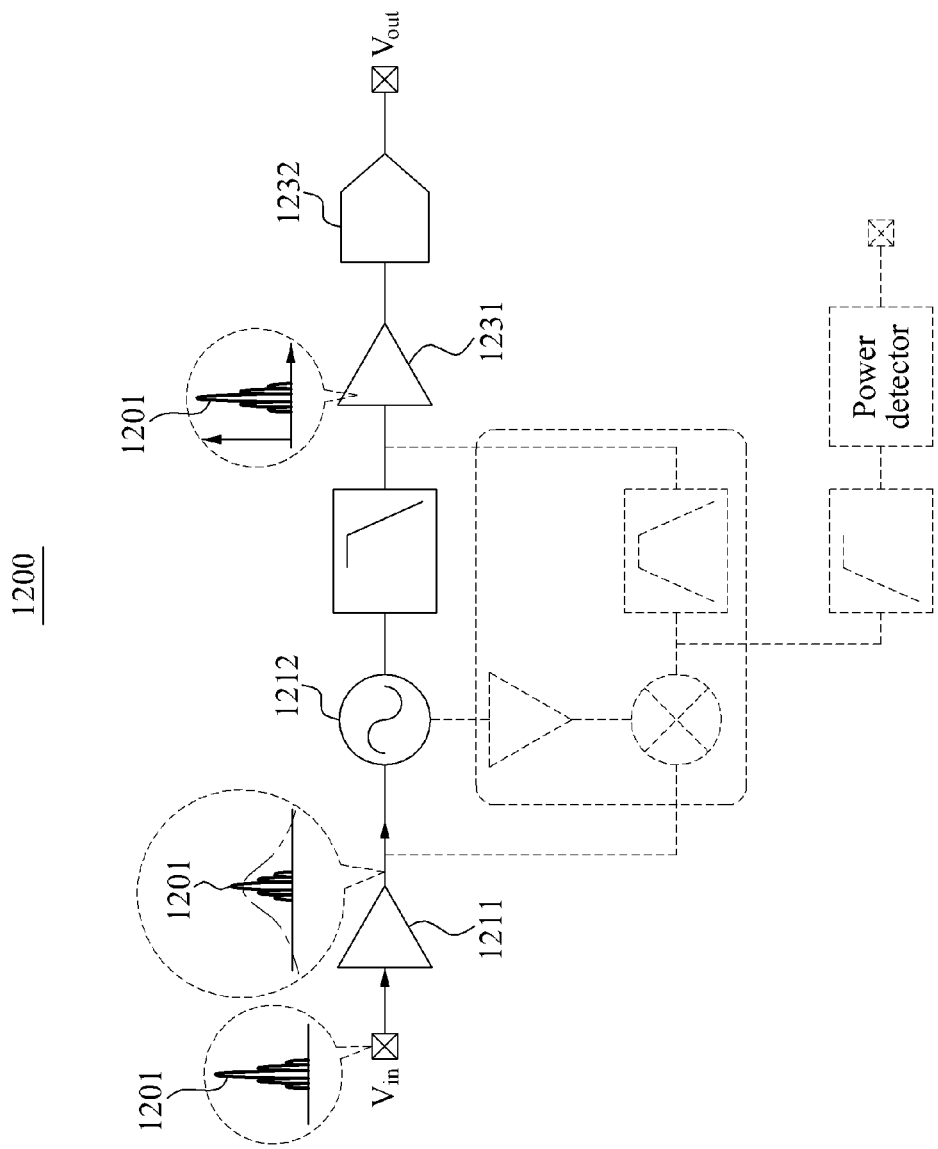

FIGS. 10 through 12 illustrate examples of a process of removing an interference signal using reception apparatuses 1000, 1100, and 1200 having a dual reception structure.

Descriptions pertaining to the LNAs 411 and 511, the SROs 412 and 512, the frequency converters 421 and 521, the filters 422 and 522, the VGAs 431 and 531, and the ADCs 432 and 532 provided with reference to FIGS. 4 and 5 are also applicable to LNAs 1011, 1111, and 1211, a first oscillator 1212, frequency converters 1021 and 1121, filters 1022 and 1122, VGAs 1031, 1131, and 1231, and ADCs 1032, 1132, and 1232 of FIGS. 10 through 12.

FIG. 10 illustrates an example in which an interference signal 1009 is removed when the reception apparatus 1000 having the dual reception structure operates using a superheterodyne reception structure.

For example, a wanted signal 1001 and the interference signal 1009 adjacent to the wanted signal 1001 are amplified by the LNA 1011. The amplified wanted signal 1001 and the interference signal 1009 are converted to an IF band by the frequency converter 1021. In this example, the frequency converter 1021 is operated by an LO signal 1002 generated by a second oscillator 1023. A predetermined band in which the wanted signal 1001 is present and the interference signal 1009 has been removed is obtained by filtering the converted signal from the frequency converter 1021 with the filter 1022, for example, an LPF or a BPF. The wanted signal 1001 remaining subsequent to removing the interference signal 1009 is amplified by the VGA 1031, and converted to a digital signal by the ADC 1032.

FIG. 11 illustrates an example of an interference detector to detect an interference signal when the reception apparatus 1100 having the dual reception structure operates using a superheterodyne reception structure.

The frequency converter 1121 is operated by an LO signal 1102 generated by a second oscillator 1123 in a manner similar to the frequency converter 1021 as shown in FIG. 10.

A wanted signal 1101 down-converted to an IF by the frequency converter 1121 passes through the filter 1122, for example, an LPF or a BPF, and is converted to a digital signal in the ADC 1132.

An interference signal 1109 down-converted to an IF by the frequency converter 1121 is detected by an interference detector 1140. In this example, the interference detector 1140 collects interference information. For example, the interference detector 1140 detects a presence of the interference signal 1109 using an interference filter 1141, for example, a high-pass filter (HPF), to filter out the interference signal 1109, and a power detector 1142 to detect an amplitude of the filtered interference signal 1109. The interference signal 1109 is determined to be present by a reception controller when the amplitude of the filtered interference signal 1109 exceeds a predetermined interference threshold value.

In this example, the interference information includes an amplitude of the interference signal 1009, but this is merely one example, and the interference information may include information required to determine a number of error packets received during a predetermined time interval, a total number of packets received during a predetermined time interval, a packet error rate (PER), a ratio of a period of time during which an interference signal is present to a predetermined time interval, a number of interference signals, and a presence of an interference signal.

FIG. 12 illustrates an example of processing a wanted signal when the reception apparatus 1200 having the dual reception structure operates using an SRR structure.

The reception apparatus 1200 receives the wanted signal at a high receiver sensitivity while operating at low power using the SRR structure due to a reception condition in which an interference signal is absent.

For example, a wanted signal 1201 passes through an LNA 1211, is amplified at a high receiver sensitivity by the first oscillator 1212, amplified in the VGA 1231, and converted to a digital signal by the ADC 1232.

Figure 13:
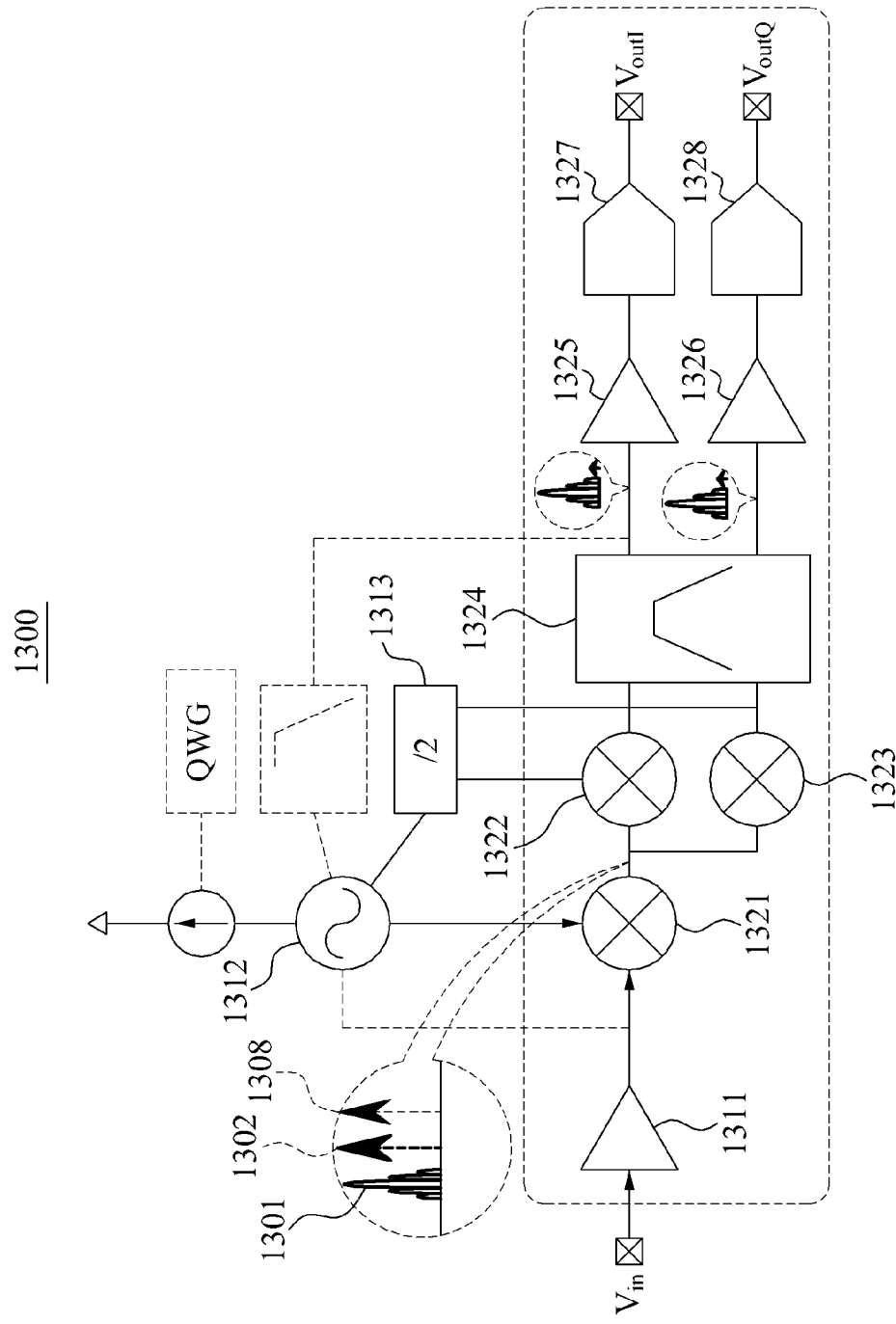
FIG. 13 illustrates an example of a reception apparatus having a dual reception structure using an in-phase signal and a quadrature signal.

FIG. 13 illustrates an example of a reception apparatus 1300 having a dual reception structure using an in-phase signal and a quadrature signal.

For example, in a superheterodyne reception structure, noise may occur due to an image signal 1308. A wanted signal 1301 is processed by being converted to an in-phase signal and a quadrature signal to remove the image signal 1308.

A signal received in an RF band includes the wanted signal 1301, for example, a real signal, and the image signal 1308. The wanted signal 1301 and the image signal 1308 pass through an LNA 1311, and are down-converted to an IF band by a frequency converter 1321. In this example, the frequency converter 1321 is operated by an output signal 1302 generated by an SRO 1312 that serves as a local oscillator (LO) signal for the frequency converter 1321.

The down-converted wanted signal 1301 and the image signal 1308 are converted to an in-phase signal and a quadrature signal in the IF band by an in-phase converter 1322 and a quadrature converter 1323. The in-phase signal and the quadrature signal are converted to digital signals through a filter 1324, VGAs 1325 and 1326, and ADCs 1327 and 1328. Through the foregoing process, the image signal 1308 is removed. In this example, the in-phase converter 1322 and the quadrature converter 1323 are operated by the output signal 1302 of the SRO 1312 divided by a divider 1313, for example, "/2".

Figure 14:
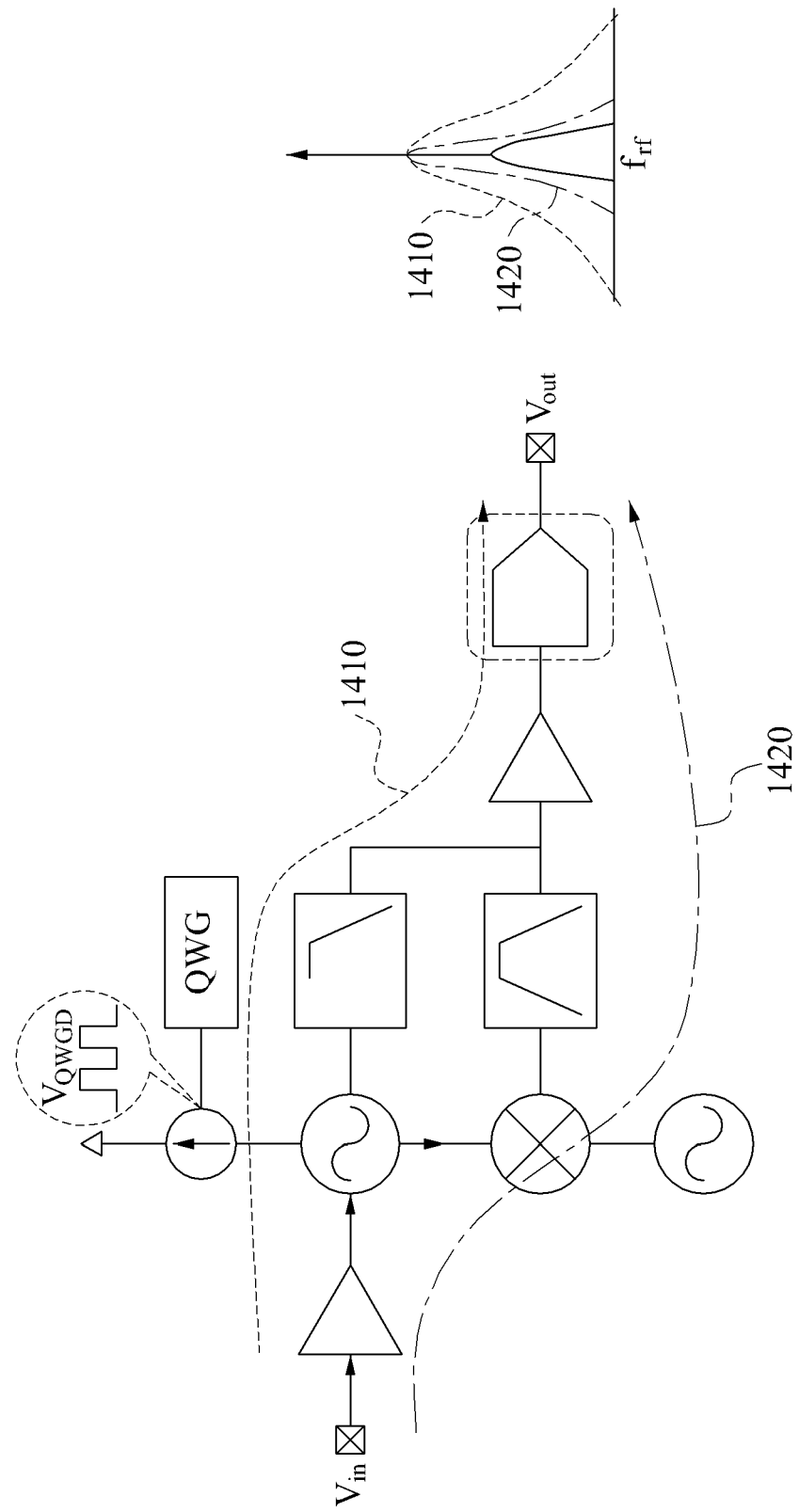
FIG. 14 illustrates an example of a frequency response characteristic of a first receiver and a second receiver in a dual reception structure.

FIG. 14 illustrates an example of a frequency response characteristic of a first receiver and a second receiver in a dual reception structure.

The first receiver, for example, an SRR structure, has a first Q factor, and the second receiver, for example, a superheterodyne reception structure, has a second Q factor. In this example, the second Q factor is greater than the first Q factor.

Referring to FIG. 14, a path 1410 of the first receiver has a frequency response characteristic with a more gradual slope than a path 1420 of the second receiver. For example, a reception apparatus having a dual reception structure may maintain an optimum reception performance by selecting one of the first receiver, for example, the SRR structure, and the second receiver, for example, the superheterodyne reception structure, based on interference information.

As previously described, the SRR structure has a high RF gain, a low power characteristic, and a low channel selectivity. The superheterodyne reception structure performs high Q filtering in a baseband (BB) using a frequency converter.

Figure 15:
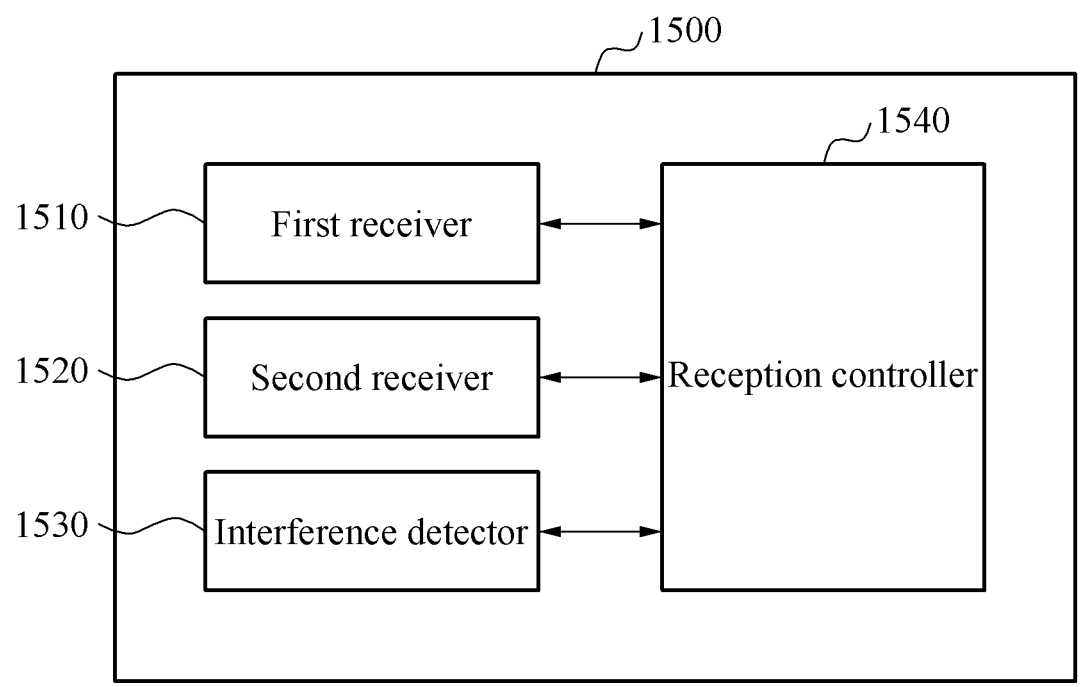
FIG. 15 illustrates an example of a structure of a reception apparatus having a dual reception structure.

FIG. 15 illustrates an example of a structure of a reception apparatus 1500 having a dual reception structure.

Referring to FIG. 15, the reception apparatus 1500 having the dual reception structure includes a first receiver 1510, a second receiver 1520, an interference detector 1530, and a reception controller 1540.

The first receiver 1510 has a first Q factor and receives a signal in a predetermined band in response to a selection of the first receiver 1510 by the reception controller 1540. In this example, the first Q factor corresponds to a wideband characteristic. For example, the predetermined band is an RF band. The signal in the predetermined band includes a wanted signal. By way of example, the first receiver 1510 includes an SRR structure.

The second receiver 1520 having a second Q factor receives a signal in response to a selection of the second receiver 1520 by the reception controller 1540. In this example, the second Q factor corresponds to a narrow band characteristic. For example, the second Q factor is greater than the first Q factor. By way of example, the second receiver 1520 includes a superheterodyne reception structure.

The interference detector 1530 detects an interference signal in an adjacent band. As used herein, the term "adjacent band" refers to a band adjacent to the predetermined band, and the interference signal is present in the adjacent band. In one example, the interference detector 1530 may distinguish between the wanted signal in the predetermined band and the interference signal in the adjacent band using the second receiver 1520 because the second receiver 1520 has a narrow band characteristic. In another example, the interference detector 1530 cannot distinguish between the wanted signal in the predetermined band and the interference signal in the adjacent band using the first receiver 1510 because the first receiver 1510 has a wideband characteristic.

The reception controller 1540 selects one of the first receiver 1510 and the second receiver 1520 to receive a signal based on interference information associated with the adjacent band adjacent to the predetermined band. In one example, the reception controller 1540 controls the second receiver 1520 to receive a signal when an interference signal is present in the adjacent band. When an interference signal is absent in the adjacent band, the reception controller 1540 controls the first receiver 1510 to receive a signal.

In another example, the reception controller 1540 calculates a packet error rate (PER) with respect to a predetermined first time interval as interference information during a reception of a signal through the first receiver 1510. When the PER is greater than a first threshold value, the reception controller 1540 controls the second receiver 1520 to receive a signal. In this example, the predetermined first time interval refers to an arbitrarily determined time interval with respect to an operating time of the first receiver 1510. For example, the PER is calculated by (number of error packets received during first time interval)/(total number of packets received during first time interval). In this example, the first threshold value corresponds to a PER value that satisfies quality-of-service (QoS) requirements prescribed for an application.

In another example, the reception controller 1540 calculates a ratio of a period of time during which an interference signal is present in the adjacent band to a predetermined second time interval as interference information during a reception of a signal through the second receiver 1520. When the ratio is smaller than a second threshold value, the reception controller 1540 controls the first receiver 1510 to receive a signal. In this example, the predetermined second time interval is an arbitrarily determined time interval with respect to an operating time of the second receiver 1520. The ratio of the period of time during which the interference signal is present is calculated by (period of time during which interference signal is present)/(second time interval). For example, the second threshold value may be set so that the reception apparatus 1500 maintains the first threshold value.

In another example, the reception controller 1540 measures an amplitude of a signal received through the first receiver 1510 and the second receiver 1520. The reception controller 1540 determines that an interference signal exists when an amplitude of the interference signal exceeds a predetermined interference threshold value. The reception controller 1540 controls an operation of the first receiver 1510, the second receiver 1520, and the interference detector 1530 based on communication conditions, for example, an amplitude of interference or a quantity of interference, and communication protocols, for example, a time division multiple access (TDMA) protocol or a carrier sense multiple access with collision avoidance (CSMA/CA) protocol.

The reception apparatus 1500 having the dual reception structure may be applied to an RF integrated circuit (RFIC), an SRR/SRO, an ultra-low power (ULP) transceiver, a low power RFIC solution, an ULP radio, a wireless local area network (WLAN), Bluetooth, Zigbee, a medical implant communication service (MICS), or any other communication application known to one of ordinary skill in the art that will benefit from the advantages provided by the reception apparatus 1500 have the dual reception structure.

Figure 16:
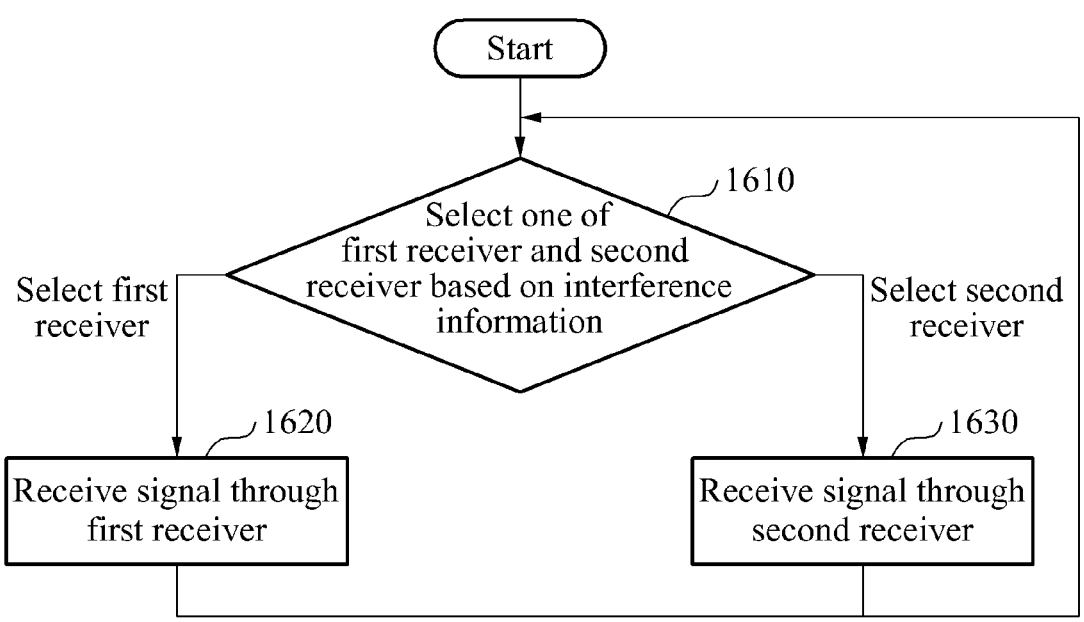
FIGS. 16 through 18 illustrate an example of a method of receiving a signal using a dual reception structure.
Figure 17:
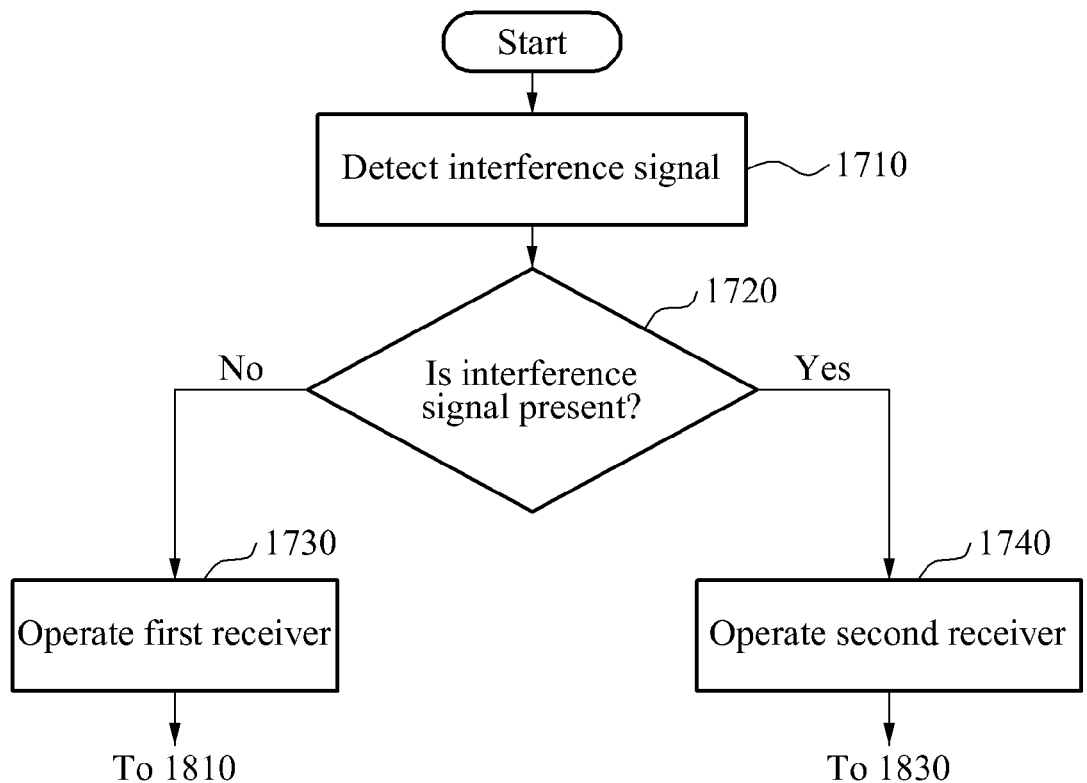
Figure 18:
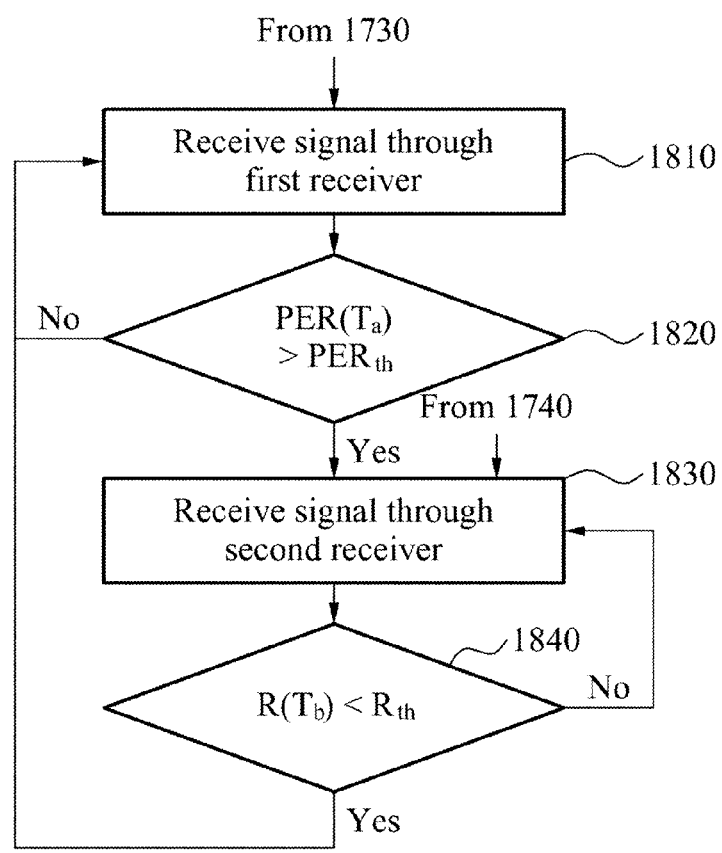

FIGS. 16 through 18 illustrate an example of a method of receiving a signal using a dual reception structure.

FIG. 16 illustrates an example of the method of receiving the signal using the dual reception structure.

In 1610, a reception controller selects one of a first receiver and a second receiver based on interference information. For example, the reception controller controls an operation of the first receiver, for example, an SRR structure, the second receiver, for example, a superheterodyne reception structure, and an interference detector based on communication conditions, for example, an amplitude of interference or a quantity of interference, and communication protocols, for example, a TDMA protocol or a CSMA/CA protocol. In this example, the reception controller operates one of the first receiver and the second receiver.

In 1620, when the reception controller selects the first receiver, a signal is received through the first receiver. In 1630, when the reception controller selects the second receiver, a signal is received through the second receiver. A reception apparatus having a dual reception structure operates to receive a signal in the structure as shown in FIGS. 4 through 15.

After a predetermined time interval has elapsed in 1620 and 1630, the reception apparatus repeats 1610. In one example, the reception controller controls the first receiver to receive a signal after the second receiver has received a signal for a predetermined time interval. As described above, the reception apparatus reduces an overall amount of power consumed by maximizing a period of time during which the signal is received through the first receiver that operates at low power.

In another example, the reception apparatus selects a receiver to receive a signal in a long-term operation based on interference information as shown in FIG. 18.

FIG. 17 illustrates an example of a method in which the reception apparatus receives a signal in a short-term operation.

The reception apparatus having the dual reception structure selects a receiver to receive a signal by determining a presence of an interference signal in an adjacent band using an interference detector prior to an operation of the reception apparatus or during a short-term operation.

In 1710, the reception apparatus having the dual reception structure detects an interference signal in an adjacent band using the interference detector. In one example, the reception apparatus operates the interference detector prior to a reception when a reception time is set for a plurality of frames. By way of example, the reception apparatus operates the interference detector prior to beginning a slot time because the slot time is preset when a communication protocol uses a TDMA, or a slotted CSMA/CA. In another example, the reception apparatus operates the interference detector at predetermined intervals when the reception time is not preset for a plurality of frames.

In 1720, the reception controller determines whether an interference signal is present in an adjacent band.

In 1730, when the interference signal is absent, the reception controller operates the first receiver. For example, the first receiver includes an SRR. When the first receiver performs a long-term operation, 1810 of FIG. 18 is performed.

In 1740, when the interference signal is present, the reception controller operates the second receiver. For example, the second receiver includes a superheterodyne receiver. When the second receiver performs a long-term operation, 1830 of FIG. 18 is performed.

When an interference signal is absent in the adjacent band, a signal is received through the first receiver. When an interference signal is present in the adjacent band, a signal is received through the second receiver.

FIG. 18 illustrates an example of a method in which the reception apparatus receives a signal in a long-term operation.

In a long-term operation, the reception apparatus performs communication using the first receiver, for example, an SRR, as a default. When a PER performance is degraded, for example, when a PER value increases, during a predetermined period of time, communication is performed using the second receiver, for example, a superheterodyne receiver. When a signal is received through the second receiver, in an absence of an interference signal in an adjacent band during a predetermined period of time, the reception apparatus changes from the second receiver to the first receiver. In such a long-term operation, an unlimited number of communication protocols may be applicable.

In 1810, the reception apparatus having the dual reception structure receives a signal through the first receiver. In this example, the reception apparatus detects an interference signal through the interference detector, and collects interference information corresponding to the interference signal. For example, the interference detector collects a number of error packets and a total number of packets received during the reception of the signal through the first receiver.

In 1820, the reception apparatus determines whether $PER(T_a)$ is greater than $PER_{th}$. In this example, $T_a$ denotes a predetermined first time interval with respect to a period of time during which the signal is received through the first receiver. $PER(T_a)$ denotes a PER measured during the time interval $T_a$. $PER_{th}$ denotes a first threshold value as a PER value that satisfies QoS requirements prescribed for an application.

For example, the reception apparatus calculates a PER based on interference information during the predetermined first time interval when the signal is received through the first receiver. In this example, when the PER is greater than the first threshold value, the reception controller controls the second receiver to receive a signal. When the PER is not greater than the first threshold value, the reception controller continues to control the first receiver to receive a signal.

In 1830, the reception apparatus receives a signal through the second receiver when $PER(T_a)$ is greater than $PER_{th}$. In this example, the reception apparatus detects an interference signal through the interference detector, and collects interference information corresponding to the interference signal. For example, the interference detector collects a period of time during which the interference signal is present in an adjacent band during the reception of the signal through the second receiver.

In 1840, the reception apparatus determines whether $R(T_b)$ is smaller than $R_{th}$. In this example, $T_b$ denotes a predetermined second time interval with respect to a period of time during which a signal is received through the second receiver. $R(T_b)$ denotes a ratio of a period of time during which the interference signal is present in the adjacent band to the time interval $T_b$. $R_{th}$ denotes a second threshold value as a ratio of a period of time during which a presence of an interference signal is accepted to a degree in which $PER_{th}$ is maintained to a period of time during which a signal-to-noise ratio (SNR) is sufficiently great.

For example, the reception apparatus calculates a ratio of a period of time during which the interference signal is present in the adjacent band to the predetermined second time interval as interference information during a reception of a signal through the second receiver. In this example, when the ratio of the period of time is smaller than the second threshold value, the reception controller controls the first receiver to receive a signal. When the ratio of the period of time is not smaller than the second threshold value, the reception controller continues to control the second receiver to receive a signal. The ratio of the period of time during which the interference signal is present in the adjacent band may be represented by an interference occupancy ratio to the adjacent band.

As described above, when the reception apparatus performs a long-term operation, the reception apparatus minimizes an amount of power consumed by maximizing an operating time of an SRR. In one example, when a signal to interference plus noise ratio (SINR) is low, a distance between a transmitter and a receiver is great, or in-band interference is present. In this instance, the first receiver may be used to receive a signal because an efficiency of removing noise may not be increase despite using the second receiver. The reception controller uses the first receiver and the second receiver in an alternating manner based on an intensity, for example, an SINR, of a received signal, in order to detect a presence of an interference signal of a communication channel, for example, an in-band signal, at low power In another example, when an interference signal is present in an adjacent band, efficiency of removing noise may be increased by using the second receiver. Accordingly, the reception controller operates the second receiver when a performance of the first receiver decreases, for example, when a PER value increases. The reception controller changes from the second receiver to the first receiver when an interference occupancy ratio of an adjacent band detected from the interference detector is low during communication using the second receiver.

The reception controller 1540 in FIG. 15 that performs the various operations described with respect to FIGS. 4-18 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reception apparatus having a dual reception structure, the reception apparatus comprising:
a first receiver having a first quality (Q) factor and configured to receive a signal in a predetermined band in response to the first receiver being selected by a reception controller;
a second receiver having a second Q factor greater than the first Q factor and configured to receive the signal in the predetermined band in response to the second receiver being selected by the reception controller;
a reception controller configured to select one of the first receiver and the second receiver based on interference information associated with an adjacent band adjacent to the predetermined band; and
an interference detector configured to filter out an interference signal from the adjacent band using an interference filter, to detect an amplitude of the filtered interference signal, and generate the interference information based on the amplitude of the interference signal.

2. The reception apparatus of claim 1, wherein the reception controller is further configured to select the second receiver to receive the signal in response to an interference signal being present in the adjacent band.

3. The reception apparatus of claim 1, wherein the reception controller is further configured to select the first receiver to receive the signal in response to an interference signal being absent in the adjacent band.

4. The reception apparatus of claim 1, wherein the reception controller is further configured to:
calculate a packet error rate (PER) with respect to a predetermined first time interval during reception of the signal by the first receiver as the interference information; and
select the second receiver to receive the signal in response to the PER being greater than a first threshold value.

5. The reception apparatus of claim 1, wherein the reception controller is further configured to:
calculate a ratio of a period of time during which an interference signal is present in the adjacent band to a predetermined second time interval during reception of the signal by the second receiver as the interference information; and
select the first receiver to receive the signal in response to the ratio being smaller than a second threshold value.

6. The reception apparatus of claim 1, wherein the first receiver comprises a super-regenerative oscillator configured to apply a super-regenerative gain to the signal; and
the second receiver comprises a frequency converter configured to be operated by an oscillation signal of the super-regenerative oscillator and configured to convert the signal to an intermediate frequency (IF) band lower than a frequency of the signal.

7. The reception apparatus of claim 1, wherein the first receiver comprises a super-regenerative oscillator configured to apply a super-regenerative gain to the signal; and
the second receiver comprises:

a local oscillator independent of the super-regenerative oscillator and configured to generate a local oscillator signal; and
a frequency converter configured to be operated by the local oscillation signal and configured to convert the signal to an intermediate frequency (IF) band lower than a frequency of the signal.

8. The reception apparatus of claim 1, wherein the second receiver comprises:
an in-phase converter configured to convert the signal to an in-phase signal in an intermediate frequency (IF) band lower than a frequency of the signal; and
a quadrature converter configured to convert the signal to a quadrature signal in the IF band.

9. The reception apparatus of claim 1, wherein the reception controller is further configured to control the first receiver to receive the signal in response to the second receiver receiving the signal for a predetermined time interval.

10. A method of receiving a signal using a dual reception structure, the method comprising:
selecting one of a first receiver having a first quality (Q) factor and a second receiver having a second Q factor greater than the first Q factor to receive a signal in a predetermined band based on interference information associated with an adjacent band adjacent to the predetermined band;
receiving the signal in the predetermined band using the selected one of the first receiver and the second receiver, and
filtering out an interference signal from the adjacent band using an interference filter, detecting an amplitude of the filtered interference signal, and generating the interference information based on the amplitude of the interference signal.

11. The method of claim 10, wherein the selecting of the one of the first receiver and the second receiver comprises selecting the second receiver in response to an interference signal being present in the adjacent band.

12. The method of claim 10, wherein the selecting of the one of the first receiver and the second receiver comprises selecting the first receiver in response to an interference signal being absent in the adjacent band.

13. The method of claim 10, wherein the selecting of the one of the first receiver and the second receiver comprises:
calculating a packet error rate (PER) with respect to a predetermined first time interval during reception of the signal by the first receiver as the interference information; and
selecting the second receiver in response to the PER being greater than a first threshold value.

14. The method of claim 10, wherein the selecting of the one of the first receiver and the second receiver comprises:
calculating a ratio of a period of time during which the interference signal is present in the adjacent band to a predetermined second time interval during reception of the signal by the second receiver as the interference information; and
selecting the first receiver in response to the ratio being smaller than a second threshold value.

15. The method of claim 10, wherein the receiving of the signal in the predetermined band using the selected one of the first receiver and the second receiver comprises:
applying a super-regenerative gain to the signal using a super-regenerative oscillator of the first receiver in response to the first receiver being the selected one of the first receiver and the second receiver; and converting the signal to a low intermediate frequency (IF) band lower than a frequency of the signal using a frequency converter of the second receiver configured to be operated by an oscillation signal of the super-regenerative oscillator in response to the second receiver being the selected one of the first receiver and the second receiver.

16. The method of claim 10, wherein the receiving of the signal in the predetermined band using the selected one of the first receiver and the second receiver comprises:
applying a super-regenerative gain to the signal using a super-regenerative oscillator of the first receiver in response to the first receiver being the selected one of the first receiver and the second receiver; and
converting the signal to an intermediate frequency (IF) lower than a frequency of the signal using a frequency converter of the second receiver configured to be operated by a local oscillation signal of a local oscillator of the second receiver in response to the second receiver being the selected one of the first receiver and the second receiver, the local oscillator being independent of the super-regenerative oscillator.

17. The method of claim 10, wherein the receiving of the signal in the predetermined band using the selected one of the first receiver and the second receiver comprises converting the signal to an in-phase signal in an intermediate frequency (IF) band lower than a frequency of the signal and a quadrature signal in the IF band in response to the second receiver being the selected one of the first receiver and the second receiver.

18. The method of claim 10, further comprising controlling the first receiver to receive the signal in response to the second receiver receiving the signal for a predetermined time interval.

* * * * *